Figure 1:
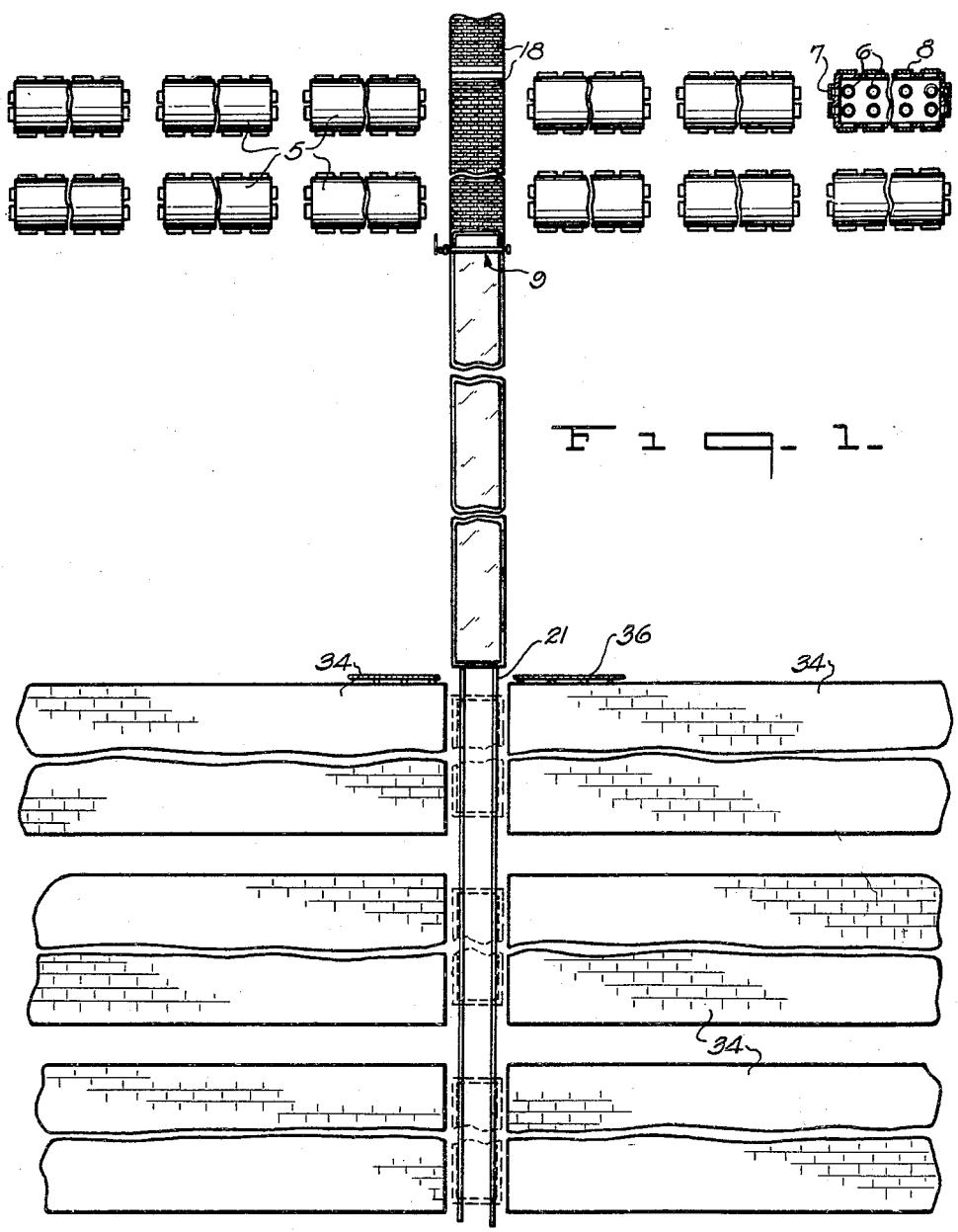

Aug. 11, 1931.   J. L. DRAKE   1,818,209
PROCESS AND APPARATUS FOR PRODUCING SHEET GLASS
Filed May 13, 1929   2 Sheets-Sheet 1

Inventor
John L. Drake.
By Frank Fraser,
Attorney

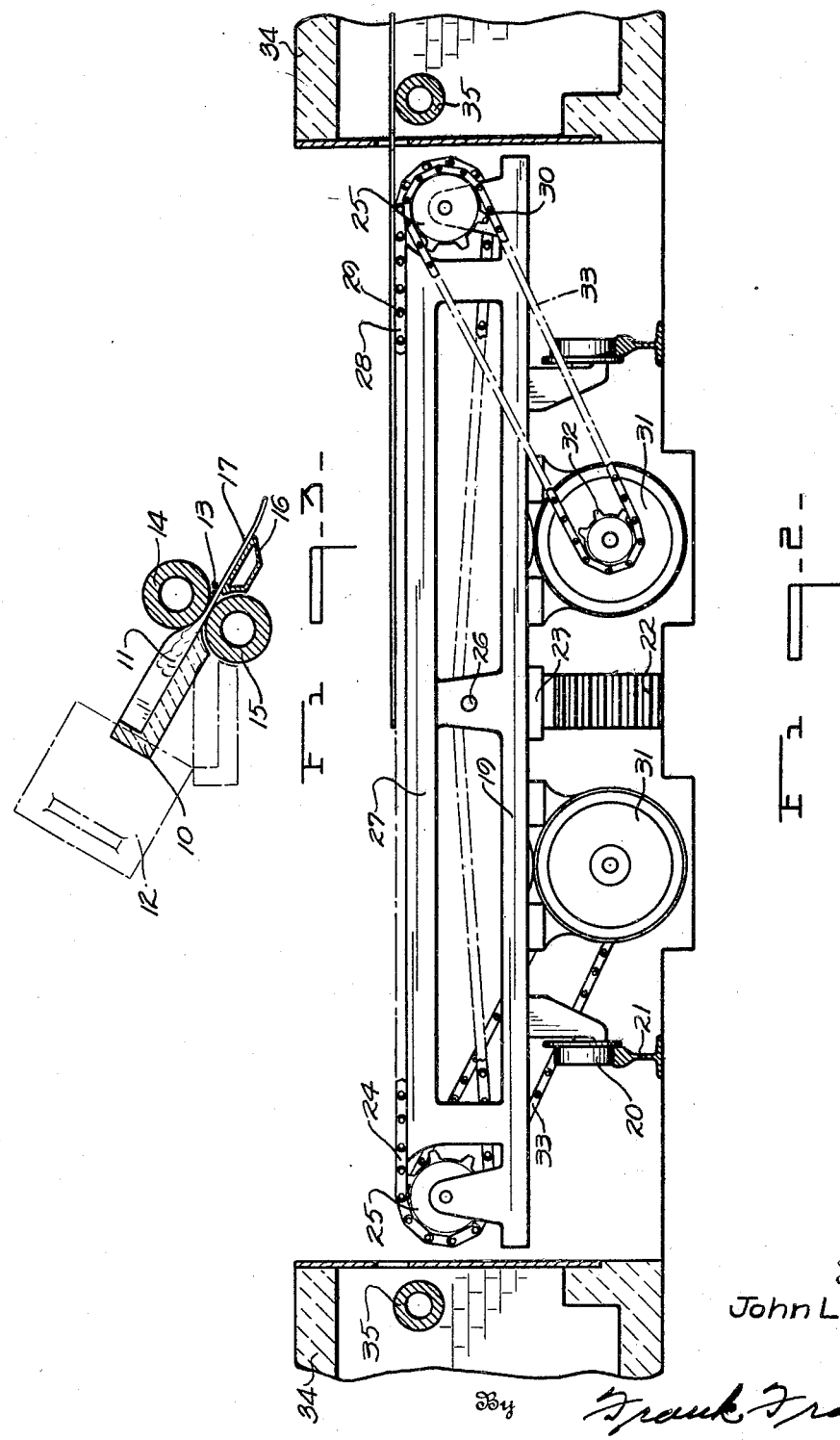

Patented Aug. 11, 1931

1,818,209

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed May 13, 1929. Serial No. 362,477.

The present invention relates to an improved system for producing molten glass, reducing it to sheet form, and annealing the sheets.

An important object of the invention is to provide a new and improved system for producing molten glass in pots, transferring the glass to a sheet forming mechanism whereby sheets of predetermined and uniform thickness are produced, carrying the sheets away from the forming mechanism at the forming speed on tables, and then transferring the sheets of glass from the tables to annealing leers and moving the sheets at a relatively lower speed than that at which they were formed to anneal them and lower their temperatures so that they may be handled.

A further object of the invention is to provide such a system comprising a plurality of glass making furnaces separated substantially in half to permit the placing of a forming mechanism centrally of the group of furnaces whereby to cut down the amount of time required to handle the molten glass after it has been formed, with conveyor means for receiving the formed sheet, said conveyor means receiving the sheet or sheets and carrying them centrally of a group of annealing leers, the conveyors and leers being such that the sheets can be introduced into any desired leer, the number of leers being sufficiently great to allow annealing of the sheets at a relatively much lower speed than the speed of sheet formation.

A still further object of the invention is to provide such a system including a track on which conveyors can be reciprocated while a group of pot furnaces are arranged on each side of the track and also a group of annealing leers are arranged on each side of the track, the sheet of glass being formed and deposited upon the conveyor, after which the conveyor is moved into sheet transferring relationship with at least one leer and the sheet passed thereinto.

Other objects and advantages of the invention will become more apparent during the course of the following description when taken in connection with the accompanying drawings.

In the drawings wherein like numerals are employed to designate like parts throughout the same, Fig. 1 is a diagrammatic plan view of the entire system, Fig. 2 is a vertical transverse section through a pair of leers showing a conveyor in end elevation, and Fig. 3 is a sectional view of one form of sheet forming mechanism that may be employed.

There are many reasons why sheets formed from pot glass are desirable. However, the cost of producing such sheets is usually considered higher than from glass made from a tank furnace by a continuous operation, and I believe this condition exists, in part at least, because of improper lay-out. The present system has been designed to give a relatively compact efficient arrangement to allow the rapid formation of the sheets and a slow annealing thereof at a relatively low cost.

Referring to Fig. 1, the pot furnaces are designated by the numeral 5. Although there is no limit to the number of furnaces employed, twelve are illustrated being divided into two groups of six each. Each furnace will accommodate a plurality of pots 6. These pots are ordinarily of substantially cylindrical construction, being formed from a suitable refractory clay and of a character that they can be readily handled by overhead crane means. The pots are arranged in the furnaces and filled with glass batch ingredients. Heating ports 7 are diagrammatically shown on the furnaces. A number of openings are also formed in each furnace, being normally covered by the closures 8. After the glass batch ingredients have been placed in the various receptacles, the temperatures of the furnace are controlled to effect melting of the batch to produce molten glass. As the batch ingredients consume more space than the molten glass formed therefrom, it is ordinarily customary to add additional batch a number of times so that the pot will eventually be practically full of molten glass. After all of the glass batch ingredients have been melted, the temperature of the furnace is adjusted to allow settling and refining of the molten glass. The proper refining of molten glass consumes considerable time, but as the glass is in a quiescent state the quality of glass ultimately produced is of exceptional quality. However, because of the long time required to properly produce the glass, a number of furnaces are considered desirable and the lay-out illustrated is believed to give an exceptionally efficient working operation. The furnaces are all grouped so that handling of the batch ingredients, etc., can be more or less concentrated as can the supply of fuel, etc. Also, overhead crane means can be used to take care of a number of furnaces.

The sheet forming mechanism, designated in its entirety by the numeral 9, is positioned preferably substantially as shown in Fig. 1. It is to be noted that its location is central of the group of furnaces. In Fig. 3 is shown more in detail the construction of the sheet forming apparatus. However, this invention is not limited to this particular type of forming means because any rolling apparatus designed for an intermittent operation and capable of rapidly forming a sheet is satisfactory. The means disclosed comprises a support 10 adapted to receive the molten glass 11 from the receptacle 12. The molten glass is flowed, by tilting the support 10, through the pass 13 created between the sheet forming rolls 14 and 15. The stripping slab 16 is provided to receive and direct the sheet away from the sheet forming pass.

The sheet 17 moving from the stripping slab 16 is deposited upon longitudinally movable supports 18, the construction and operation of which is more clearly set forth in Fig. 2.

Each conveyor consists of a truck 19 carried by the wheels 20 which run on the tracks 21. The truck is propelled by means of a pinion 22 connected to a suitable source of power and meshing with the rack bar 23 carried by the underside of the truck. Adapted to operate transversely of the truck is an endless belt formation 24 supported on suitable drums or sprockets 25 at its ends, while an idler roll carried on the shaft 26 is provided to maintain the endless belt formation taut. The truck is shaped to create a table 27 on which the endless belt conveyor slides in its upper horizontal run. The conveyor preferably consists of a plurality of intermeshing links 28 pivotally associated as at 29. The plan view in Fig. 1 shows the general appearance of the links, although the conveyor does not necessarily have to be formed from the type of link shown. In fact, the conveyor can be formed from sheet metal or asbestos suitably reinforced, or a different type of link. Each of the drums 25 is provided with a sprocket 30. Arranged on the underside of the truck is a pair of motors 31, each adapted to drive a sprocket 32, which in turn drives a chain 33 trained about the sprocket 30. The two motors and associated parts are provided to allow movement of the conveyor in either direction transversely of the table. Flexible cables, mounted on suitable drums, can be used to supply current to the motors and to also allow the use of remotely controlled switches for the motors.

As will be seen in Fig. 1, the tracks 21 extend between two groups of annealing leers 34, the annealing leers extending transversely away from the tracks. Each annealing leer contains a conveyor adapted to receive the glass and to support and convey the same through the leer. In Fig. 2 the leers are provided with rolls 35 which are rotated by the drive means 36. Obviously, temperature control means are positioned within the annealing leers to secure proper annealing and cooling of the glass.

In practicing this invention, the molten glass is produced in the furnaces 5 in the individual pots or receptacles 6. To make a semi-continuous operation, the furnaces can be operated so that the pots therein will be in different stages of completion, permitting rolling of the glass for an extended period of time. Of course, the number and capacity of the furnaces will more or less determine the time required for the rolling of all of the molten glass. After the glass has been properly refined, an overhead crane or other lifting apparatus is used to take the pots one at a time from the furnaces and arrange them in operative association with the rolling means 9. The pot of glass is then tilted to remove the glass and place it upon the support 10 from which it flows and is rolled into a sheet. The sheet formed is deposited upon the conveyors or supports 18. During the rolling operation and movement of the trucks upon the tracks 21, the endless conveyors remain stationary upon the trucks except insofar as they move horizontally with the truck. In other words, at this stage of the operation, the motors 31 are not operated. Also, the tables or supports move along the tracks during the rolling operation at a speed identical with the peripheral speed of the rolls so that the sheet will be carried away from the forming mechanism at the sheet forming speed. Instead of using a single long table 18, it is preferred that a group, for instance three tables, be used. Instead of handling a single long sheet, I prefer to cut the sheet into sections and if three tables or supports are used for receiving the sheet, the sheet can be cut twice, preferably at the juncture of the three tables, to produce three separate lengths. Further, during the rolling operation, the three tables, if such number is used, can be pushed one in abutting relation with the other beneath the forming mechanism, or the tables can be positively bolted or otherwise clamped together. After the single sheet has been cut into lengths, the tables can be separated, and with the layout illustrated each table is moved between a pair of oppositely disposed leers. The tables may then be stopped and either one of the motors 31 started to cause rotation of the conveyors 24. As the conveyors operate transversely of the tables, the sheet will be moved transversely therefrom. It is of course clear that the sheet can be moved into either the right or left hand leers, and as a matter of fact to allow a relatively long time for annealing, the sheets are preferably alternately fed into first one leer and then into the other. Due to the number of leers employed, the sheets of glass can be formed at a relatively high rate of speed and transferred to annealing leers and there moved at a relatively low rate of speed to obtain satisfactory annealing in relatively short leers. The particular relation between the sheet forming mechanism, sheet receiving tables, and leers shown in this application is claimed in my copending application Serial No. 297,016, filed August 2, 1928.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A system for producing sheet glass, comprising a track, annealing leers arranged on each side of the track, a plurality of conveyor means adapted to be reciprocated upon said track, a sheet forming mechanism positioned over the track and adapted to deposit the sheet formed on the conveyor as it moves therebeneath, said sheet being produced at a relatively high rate of speed, said sheet also being divided into sections, each of said conveyor means being provided with transversely movable means, and means for operating the transversely movable means both to the right and left whereby the sheets can be transferred to the leers on either side of the track as desired.

2. A system for producing sheet glass comprising a track, annealing leers arranged at opposite sides of the track, conveyor means movable along the track, means for forming a sheet of glass and depositing it upon the conveyor means, said conveyor means having a transversely movable portion, and means for operating said transversely movable portion both to the right and left whereby the sheets can be transferred into the leer on either side of said track as desired.

3. A system for producing sheet glass, comprising a track, annealing leers arranged at opposite sides of the track, conveyor means movable along the track and including a truck and an endless conveyor belt carried thereby and operable transversely thereof, sheet forming mechanism positioned over the track and adapted to deposit the sheet formed on said endless conveyor belt as the conveyor means moves therebeneath, and means for operating the endless conveyor belt both to the right and left whereby the sheets can be transferred to the leer at either side of said track as desired.

Signed at Toledo, in the county of Lucas and State of Ohio, this 11th day of May, 1929.

JOHN L. DRAKE.